April 5, 1949. J. F. NOONAN 2,466,265
SAFETY BUMPER FOR MOTOR VEHICLES
Filed May 23, 1945 2 Sheets-Sheet 1

INVENTOR.
JOSEPH F. NOONAN
BY
*ATTORNEY.*

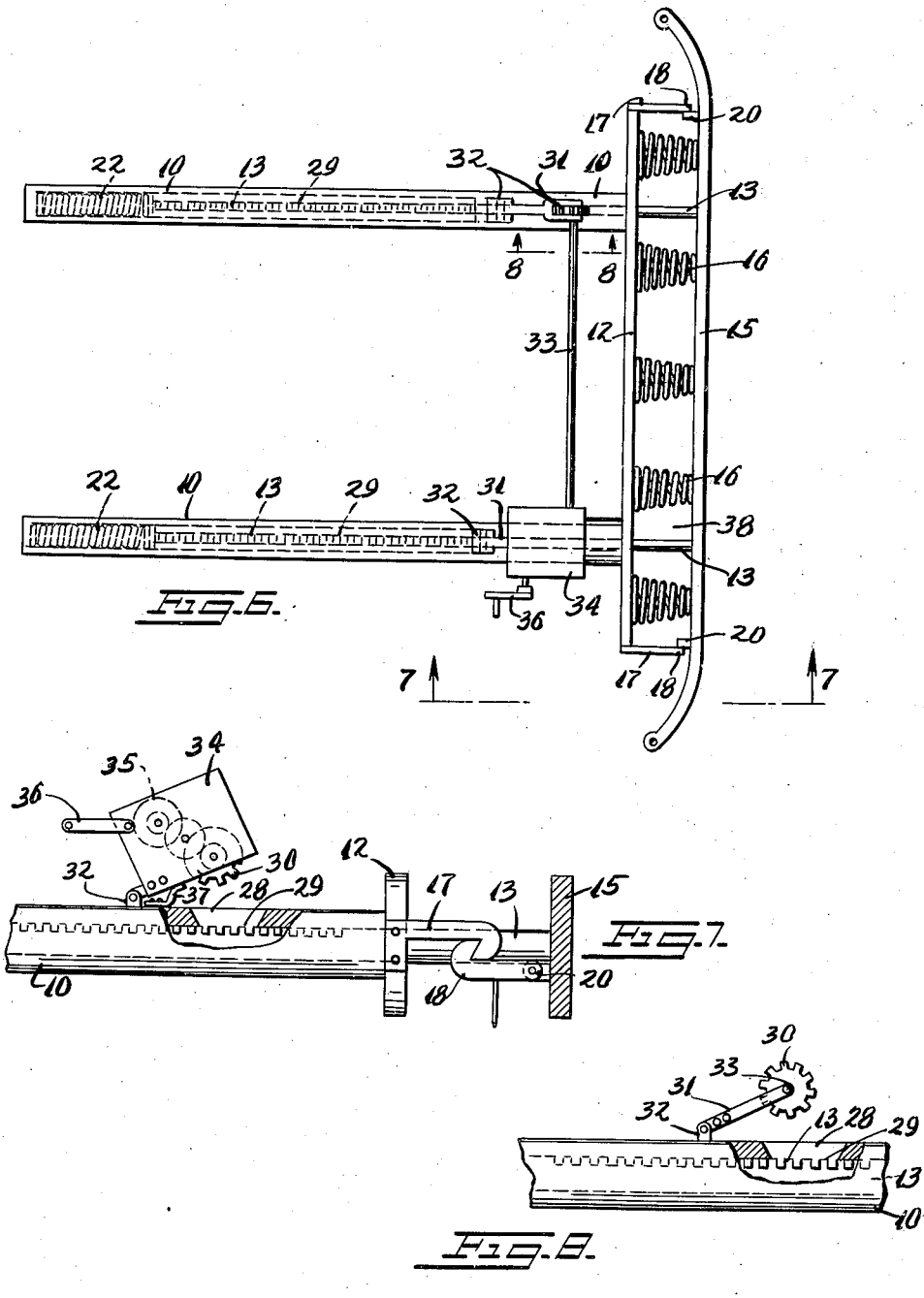

Patented Apr. 5, 1949

2,466,265

UNITED STATES PATENT OFFICE 2,466,265

SAFETY BUMPER FOR MOTOR VEHICLES

Joseph F. Noonan, Elmhurst, Long Island, N. Y.

Application May 23, 1945, Serial No. 595,440

1 Claim. (Cl. 293—73)

This invention relates to new and useful improvements in a safety bumper for motor vehicles.

More particularly, the invention proposes a new and improved bumper which is characterized by a front bumper bar resiliently supported and normally tending to move outwards and associated with latching means for holding it in a retracted position. It is proposed to so arrange the latch means that when an object touches the bumper and causes the front bumper bar to move slightly inwards, the latching means opens and then the resilient means is capable of moving the front bumper bar forwards. This is particularly advantageous on motor vehicles for preventing a person or animal from being run over by the wheels of the motor vehicle. The improved bumper will act thusly when the front bumper comes in contact with a body, the front bumper is protruded forward due to a series of springs, and acts as a cradle for said body till such time as the vehicle will or should have stopped.

The invention contemplates several forms of bumpers embodying the basic concepts thereof.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 6 is a plan view of a safety bumper for motor vehicles constructed in accordance with still another form of this invention.

Fig. 7 is a fragmentary sectional view taken on the line 7—7 of Fig. 6.

Fig. 8 is a fragmentary view similar to a portion of Fig. 7 but illustrated with certain of the parts removed.

Figure 1:
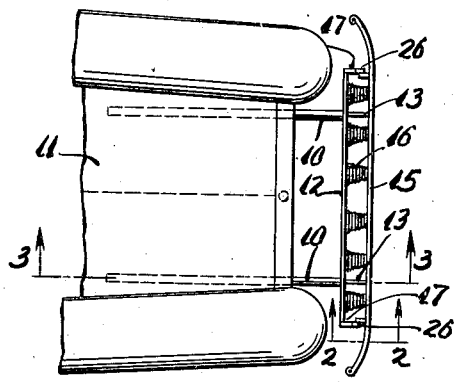
Fig. 1 is a fragmentary plan view of an automobile provided with a safety bumper constructed in accordance wtih this invention.
Figure 2:
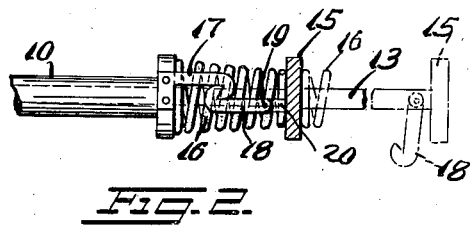
Fig. 2 is a fragmentary enlarged vertical sectional view taken on the line 2—2 of Fig. 1.
Figure 3:
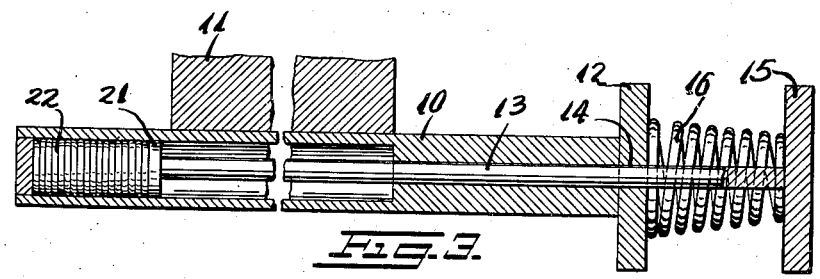
Fig. 3 is a fragmentary enlarged vertical sectional view taken on the line 3—3 of Fig. 1.

The safety bumper for motor vehicles, in accordance with that form of the invention illustrated in Figs. 1-3 inclusive, includes a pair of transversely spaced parallel tubular members 10 for attachment upon the body 11 of a motor vehicle. A connector bar 12 is fixedly mounted across the tubular members 10. Rods 13 are slidably mounted in and project from the tubular members 10 and extend through openings 14 in the connector bar 12.

A front bumper bar 15 is fixedly mounted across the rods 13. This bumper bar 15 is resiliently urged forwards by a group of springs 16 acting between the connector bar 12 and the front bumper bar 15. These springs 16 preferably are fixedly mounted upon the bar 12.

The front bumper bar 15 is releasably connected with the connector bar 12 by latch means. This latch means includes hooks 17 mounted upon the ends of the connector bar 12 and directed downwards. These hooks 17 are fixed or stationary. They engage complementary hooks 18 directed upwards. These complementary hooks 18 are pivotally mounted by pintles 19 upon lugs 20 upon the front bumper bar 15.

The rods 13 extend into the tubular members 10 and have their inner ends provided with heads 21. Springs 22 are mounted within the tubular members 10 and act against the heads 21 for normally urging the bars 13 outwards and assisting the springs 16 in urging the front bumper bar 15 forwards.

The operation of the device is as follows:

The parts are normally in the position indicated by the full lines on the drawing. Should the motor vehicle strike an object so that the front bumper bar 15 is slightly displaced inwards, the hooks 18 will fall downwards by gravity, assuming the positions shown by the dot and dash lines in Fig. 2. This releases the front bumper bar 15 which will be immediately urged forward by the springs 16 and 22. When the front bumper comes in contact with a body, the front bumper is protruded forward, due to a series of springs 16, and acts as a cradle for said body till such time as the vehicle will or should have stopped, and in this way prevents the wheels of the vehicle running over the object.

Figures 4, 5:
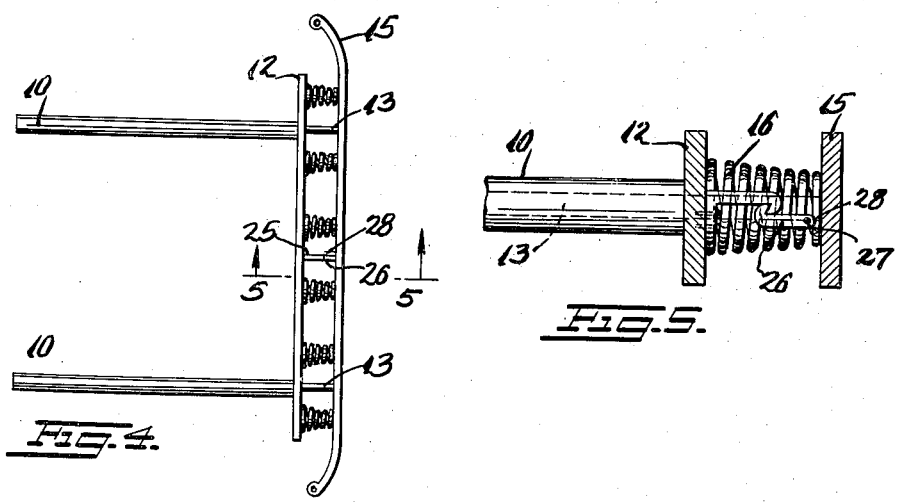
Fig. 4 is a plan view of a safety bumper constructed in accordance with a modified form of this invention.
Fig. 5 is a fragmentary enlarged vertical sectional view taken on the line 5—5 of Fig. 4.

In Figs. 4 and 5 a modified form of the invention is disclosed which is very similar to the prior form, distinguishing merely in the fact that one centrally located hook 25 is fixedly mounted upon the connector bar 12 and extends forward and is directed downwards and is normally engaged by a pivotally mounted hook 26 which is supported by a pintle 27 on a lug 28 formed on the front bumper bar 15.

In other respects this form of the invention is similar to that previously shown and like reference numerals identify like parts in each of the several views.

In this form of the invention the front bumper bar 15 is held retracted by but one centrally located latch. When an automobile equipped with this safety bumper strikes an object the latch hook 26 will be released and will fall downwards which in turn releases the front bumper bar.

In Figs. 6–8, still another form of the invention has been disclosed which is very similar to the first form of the invention, distinguishing essentially in the fact that retracting means for the front bumper 15 have been associated with the rods 13. More specifically, the tubular members 10 are formed with openings 28 exposing portions of the rods 13. These exposed portions are formed with rack teeth 29. Gears 30 adapted to engage through the openings 28 and mesh with the rack teeth 29, are mounted on brackets 31 which are hingedly supported at their rear ends on lugs 32 mounted on the tubular members 10. The gears 30 are connected with each other by a shaft 33. A casing 34 is mounted on one of the brackets 31. This casing 34 houses a gear transmission 35 which may be manually driven by an extending handle 36. The gear transmission 35 is arranged to drive the pinions 30. A spring 37 normally urges the casing 34 upwards. The bottom hooks 18 of the latch means are connected together for unitary operation by a connecting bar 38.

The operation of this form of the invention is as follows:

Normally, the front bumper bar 15 is held in its retracted position by the hooks 17 and 18 engaging each other. When the bumper strikes an object, the front bumper bar 15 will be pressed inwards, freeing the hooks 18 which move downwards by gravity and free the front bumper bar 15. The resilient means will immediately urge the front bumper bar 15 forwards and will force the object away from the motor vehicle.

After the front bumper bar 15 is extended it may be moved back to its original position by manually pivoting the casing 34 downwards against the action of the spring 37 so that the pinions 30 engage through the openings 28 and mesh with the rack teeth 29. The handle 36 is then rotated to indirectly rotate the pinions 30 and thus retract the rods 31. When the front bumper bar 15 is in its retracted position the hooks 18 are lifted upwards by lifting but one hook or the connecting bar 38. The other hook will be similarly lifted because of the connecting rod 38. When the hooks 17 and 18 engage each other the casing 34 is released and the spring 37 will raise it so as to disconnect the pinions 30 from the rack teeth 29.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A safety bumper for motor vehicles, comprising a pair of tubular members, a bar connecting the forward ends of the tubular members to each other, rods slidable through the bar in said tubular members and extending forwardly of the bar, a bumper mounted on the forward ends of the rods, springs between the bumper and the bar for holding the bumper forwardly of the bar, a forwardly extending latch member carried by each end of the bar, a gravity actuated latch member carried by each end of the bumper and arranged to engage the adjacent latch member of the bar and to drop by gravity when said bumper is pushed against said springs, and springs for propelling the rods forwardly when the latches are disengaged.

JOSEPH F. NOONAN.

REFERENCES CITED

The following references are of record in the file of this patent:

UNITED STATES PATENTS

| Number | Name | Date |
| --- | --- | --- |
| 271,137 | Sewell | Jan. 23, 1883 |
| 628,271 | Luther | July 4, 1899 |
| 942,566 | Kelly | Dec. 7, 1909 |
| 1,496,112 | Branschbach | June 3, 1924 |
| 1,499,576 | Glover | July 1, 1924 |
| 1,770,641 | Brennan | July 15, 1930 |
| 2,048,945 | Pacheka | July 28, 1945 |
| 2,134,108 | Drude | Oct. 25, 1938 |

FOREIGN PATENTS

| Number | Country | Date |
| --- | --- | --- |
| 340,403 | Great Britain | Jan. 1, 1931 |